United States Patent [19]

Mitamura et al.

[11] Patent Number: 5,159,503
[45] Date of Patent: Oct. 27, 1992

[54] PHASE AND PERIOD SYNCHRONIZATION FOR A SLAVE DISK DRIVE

[75] Inventors: Masahiro Mitamura; Takeo Iwai; Katsuhiro Tsuneta; Yoshinori Tuneda; Akihiro Nakamura, all of Odawara, Japan

[73] Assignees: Hitachi, Ltd., Tokyo; Hitachi Computer Peripherals Co., Ltd., Odawara, both of Japan

[21] Appl. No.: 531,336

[22] Filed: May 31, 1990

[30] Foreign Application Priority Data

Jun. 1, 1989 [JP] Japan .................. 1-139971

[51] Int. Cl.⁵ ............................................. G11B 15/46
[52] U.S. Cl. ........................... 360/73.02; 360/73.03; 318/625
[58] Field of Search ................. 360/15, 73.02, 73.03; 318/625

[56] References Cited

U.S. PATENT DOCUMENTS

| | | | |
|---|---|---|---|
| 3,503,058 | 3/1970 | Ault et al. | 360/73.02 |
| 3,893,178 | 7/1975 | Sordello | 360/86 X |
| 4,471,390 | 9/1984 | Hamann | 360/73.03 X |
| 4,618,897 | 10/1986 | Johnson et al. | 360/15 |
| 4,907,105 | 6/1990 | Kurzweil, Jr. | 360/73.02 |

FOREIGN PATENT DOCUMENTS

| | | | |
|---|---|---|---|
| 58-19768 | 2/1983 | Japan | 360/73.03 |
| 61-160877 | 7/1986 | Japan | |
| 61-258699 | 11/1986 | Japan | |

Primary Examiner—Joseph L. Dixon
Assistant Examiner—David L. Robertson
Attorney, Agent, or Firm—Fay, Sharpe, Beall, Fagan, Minnich & McKee

[57] ABSTRACT

In a system equipped with a plurality of magnetic disk devices, one magnetic disk device is used as a device (master unit) for generating reference signals for rotating other plurality of devices in synchronism. Other one or more magnetic disk devices (slave units) are rotated in synchronism following the reference signals generated from the master unit. In order to maintain the synchronism of revolution between the master unit and the slave units, the conditions of revolution of the two spindle motors are compared to maintain the synchronism of revolution. Index pulses recorded on the magentic disks of the master unit and the slave units are used as reference signals for maintaining synchronism of revolutions. Index pulses from the master unit and the slave units are compared to find a phase difference signal and a period difference signal, and the rotational speed of the slave units is compensated by using these two signals.

16 Claims, 6 Drawing Sheets

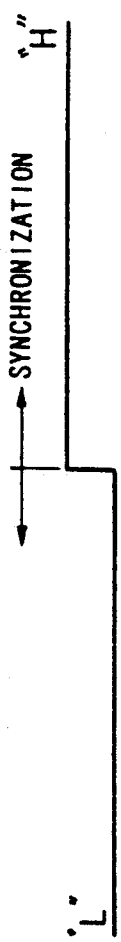
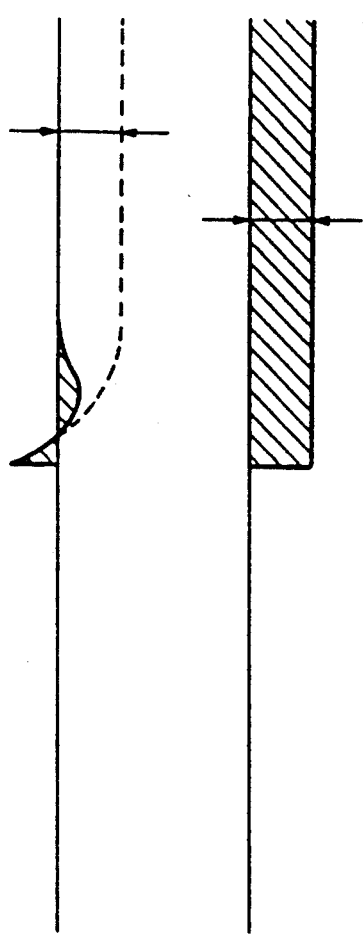
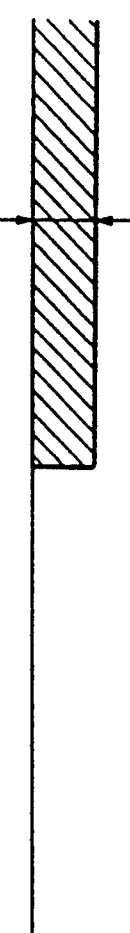
FIG. 4a  SYNC ON SIGNAL
FIG. 4b  CONTROL SIGNAL Vva (VELOCITY DETECTOR 2a)
FIG. 4c  PHASE DIFFERENCE SIGNAL Vφ (PHASE COMPARATOR 8a)
FIG. 4d  PERIOD DIFFERENCE SIGNAL Vθ (PERIOD DIFFERENCE DETECTOR 9a)

PHASE AND PERIOD SYNCHRONIZATION FOR A SLAVE DISK DRIVE

FIELD OF THE INVENTION

This invention relates to storage units and to a method of synchronizing a plurality of individual storage units joined in parallel.

BACKGROUND OF THE INVENTION

A conventional electronic computer system is equipped with a plurality of magnetic disk devices as external storage units for storing large amounts of data. In such a system, it is important to transfer large amounts of data for video processing among the individual disk devices at high speeds. However, the data transfer speed of the individual magnetic disk devices is limited by the speed of revolution of the magnetic disk and the like, and is difficult to increase.

Previous systems proposed a technique of transferring data simultaneously to the individual disk devices by synchronously driving the spindle motors that drive the disks. According to this technique, it is important for the spindle motors of the individual disk devices to have the same rotational phase. For instance, Japanese Patent Laid-Open No. 160877/1986 discloses a technique which finds the difference between the rotational phase of a reference spindle motor and the rotational phase of a spindle motor that rotates following thereto. This system then transmits a compensation signal which corresponds to the rotational phase difference of these motors to the revolution control circuit of the spindle motor of the follow-up side to drive each motor in synchronism.

According to the above prior art, each magnetic disk device has a reference revolution control circuit which includes a reference signal generating circuit such as a quartz oscillator that maintains the speed of revolution constant. When the spindle motors of the reference side and the follow-up side have an equal speed of revolution, the synchronous operation can be carried out sufficiently. However, the inventors have found the problem that it is difficult to drive the individual spindle motors at perfectly the same speed and the problem that when there is a difference in the speed of revolution of these spindle motors at the start of synchronous operation, a steady phase difference occurs depending upon the speed of revolution, making it impossible to achieve perfect synchronous operation.

When data is transferred in parallel from the individual magnetic disks to a higher-rank apparatus such as a host computer, it becomes necessary to temporarily store the data in a buffer memory of the data transfer circuit to absorb the difference of arrival time of the transferred data in order to bring the transfer of data into synchronism. The inventors, however, have found the fact that when the plurality of spindle motors have large difference in the revolution, their speed of buffer memory must have an increased capacity.

OBJECTS OF THE INVENTION

A first object of the present invention is to provide a synchronized motor control system which is capable of decreasing the steady difference in the rotational phases that occur during synchronous operation.

A second object of the present invention is to provide a synchronized motor control system that is capable of decreasing the capacity of the buffer memory that is necessary for transferring data in parallel during the synchronous operation.

SUMMARY OF THE INVENTION

In order to achieve the above objects, features of the present invention resides in the following constitution.

In a system equipped with a plurality of magnetic disk devices, one magnetic disk generates reference signals for driving other disk in synchronism (hereinafter, the magnetic disk that generates the reference signals is referred to as a "master unit"). Other magnetic disks (hereinafter referred to as "slave units") are driven in synchronism following the reference signals generated by the master unit.

According to the present invention, the rotational phase and frequency of the spindle motors of the master and slave units are compared with each other and are brought into synchronism in order to synchronize their revolutions. The reference signals for maintaining the synchronous revolution are servo signals such as index signals recorded on the magnetic disks of the master unit and the slave units. The index signals obtained from the master and slave units are compared with each other, and the speed of revolution of the slave units is so compensated that the phase difference becomes zero. Furthermore, in order to compensate for a steady phase difference arising from the difference of period of revolution of the spindle motors between the master side and the slave side, the speed of revolution of the slave units is adjusted using a compensation value which is proportional to the difference in the number of revolution specific to the spindle motors.

The synchronized operation is carried out as described below. Prior to operating a plurality of magnetic disks in synchronism, the spindle motors of the magnetic disk devices are independently rotated until steady revolutions are obtained. Each magnetic disk has a revolution control circuit. In this case, the master unit produces a master index signal that serves as a reference signal for rotating the slave-side disks in synchronism based upon the index signals written on a surface of the magnetic disk. Similarly, each slave unit produces a slave index signal that serves as a reference for bringing the phase into agreement with the master index signal based on the index signals written on a surface of the disk. As the speed of revolution reaches nearly the steady state, the revolution control circuit of the slave unit determines the difference in period between the master index signal and the slave index signal, and the difference in period is stored in the buffer. Then, the plurality of magnetic disk devices have their rotation interlocked with each other. At this moment, the difference in period stored in the buffer is added as a compensation value to the revolution control circuit of the slave side. Then, the index signals from the master side are successively compared with the index signals from the slave side, and the speed of revolution of the slave unit is adjusted so that the difference in phase becomes zero.

The present invention will be more apparent from the following detailed description, when taken in conjunction with the accompanying drawings.

BRIEF DESCRIPTION OF THE DRAWINGS

FIGS. 4a to 4d are diagrams showing a period difference signal $V_\theta$ and a phase difference signal $V_\phi$ in FIG. 1;

DESCRIPTION OF THE PREFERRED EMBODIMENTS

Figure 1:
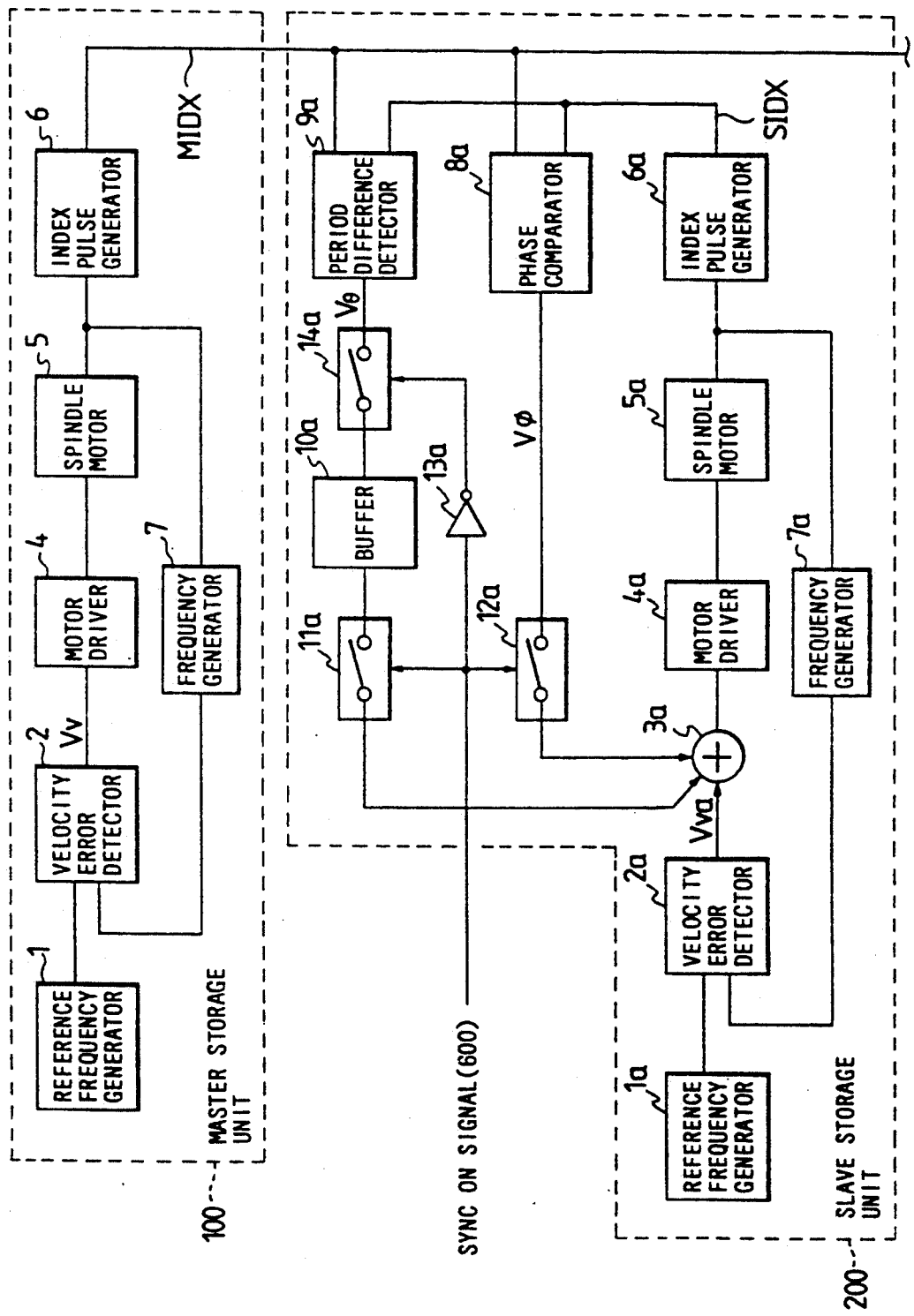
FIG. 1 is a block diagram illustrating the constitution of storage units according to an embodiment of the present invention.
Figure 2:
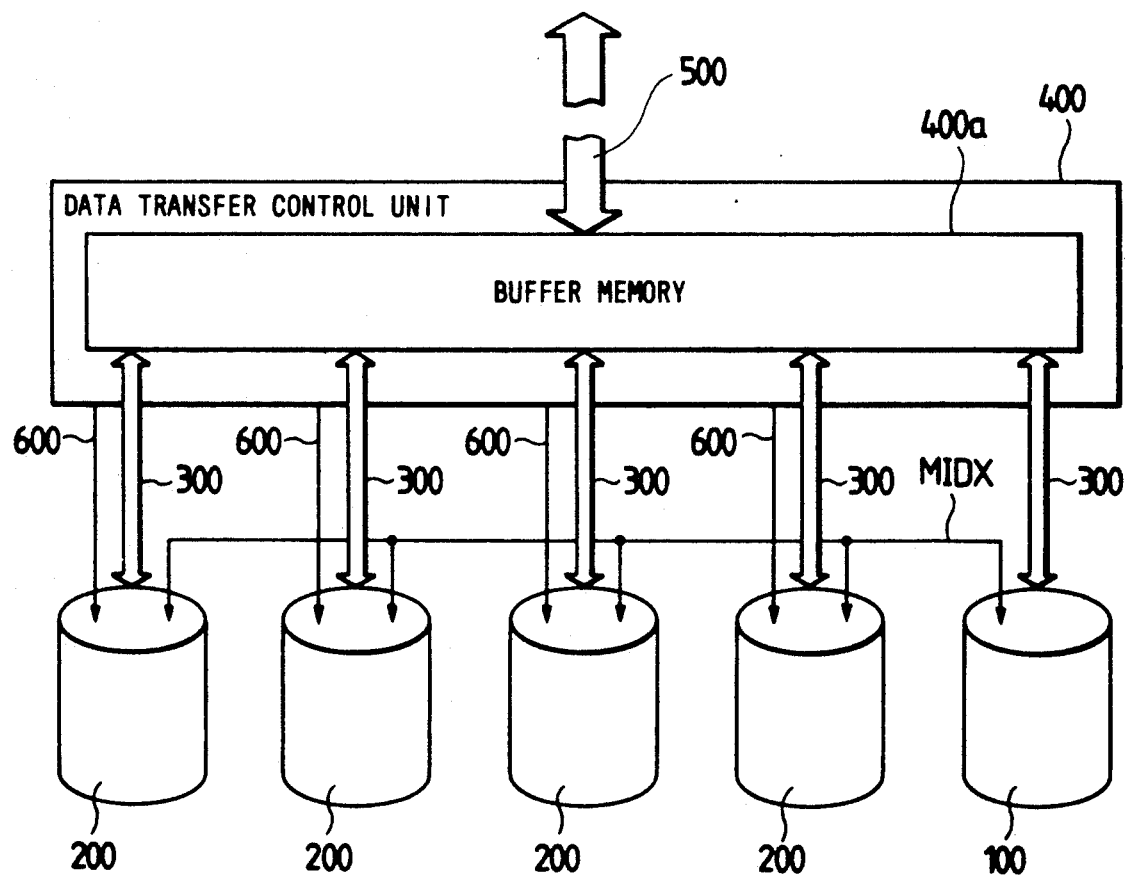
FIG. 2 is a block diagram illustrating the whole constitution of a synchronized motor control system for storage units according to the embodiment of the present invention.

First, an outline of the synchronized motor control system for storage units of the embodiment will be described in conjunction with FIGS. 1 and 2.

The synchronized motor control system for storage units of the embodiment is constituted by a master storage unit 100 that serves as a reference in the synchronized operation, and one or more slave storage units 200 which are connected to a higher-rank data transfer control unit 400 via data lines 300.

The data transfer control unit 400 is connected, via data line 500, to a higher-rank unit such as a channel unit of an electronic computer system and a central processing unit that are not diagramed. The data transfer control unit 400 has a plurality of storage units 100, 200 and a buffer memory 400a which temporarily stores the data that is to be transferred to the higher-rank units. The buffer memory 400a adjusts variations of the transfer times of the data transferred in parallel from the plurality of storage units 100, 200 to the higher-rank unit. Further, the data transfer control unit 400 gives a SYNC-ON signal 600 to the slave storage units 200 to instruct synchronous operation.

The storage unit 100 that serves as a reference in the synchronous operation has a spindle motor 5 that drives a magnetic disk (not shown), a frequency generator 7 that generates signals of a frequency corresponding to the number of revolutions of the spindle motor 5, a reference frequency generator 1 that produces reference signals to determine the number of revolutions of the spindle motor, a velocity error detector 2 that produces a control signal Vv proportional to the difference between an output of the reference frequency generator 1 and an output of the frequency generator 7, and a motor driver 4 that feeds a power source corresponding to the control signal Vv to the spindle motor 5. Using a feedback loop control system constituted by the velocity error detector 2, motor driver 4, spindle motor 5, and frequency generator 7, the number of revolutions per second of the spindle motor 5 is controlled to have the same frequency as a reference signal of reference frequency generator 1. The spindle motor 5 is connected to an index pulse generator 6 that generates master index pulses (MIDX). The index pulse generator 6 generates a pulse for each revolution of the spindle motor 5, i.e., generates master index pulses (MIDX) of a period $T_1$ that corresponds to an actual number of revolutions of the spindle motor 5. The master index pulses (MIDX) are also sent to the slave storage units 200.

The slave storage unit 200 is fundamentally as the master storage unit 100, i.e., has a spindle motor 5a, a frequency generator 7a, a reference frequency generator 1a, a velocity error detector 2a, a motor driver 4a, and an index pulse generator 6a. The spindle motor 5a is connected to index pulse generator 6a that generates slave index pulses (SIDX). The index pulse generator 6a generates a pulse for each revolution of spindle motor 5a, i.e., generates slave index pulses of a period $T_2$ that corresponds to an actual number of revolutions of the spindle motor. The slave index pulses (SIDX) are sent to a phase comparator 8a and a period difference detector 9a that will be described later.

Figure 3A:
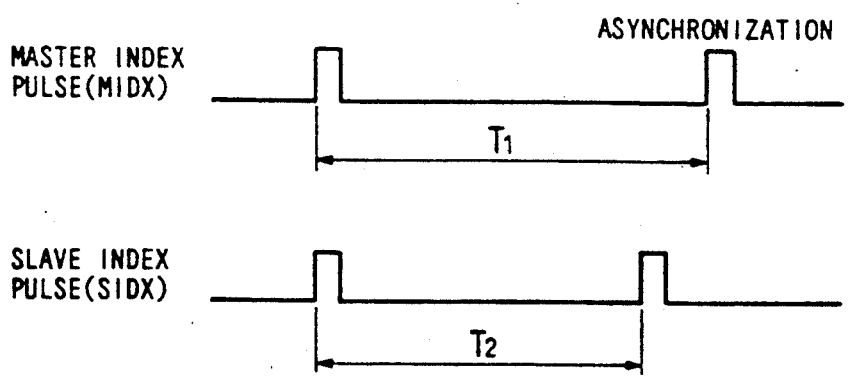
FIGS. 3a and 3b are diagrams illustrating a relationship between the master and slave index signals in FIG. 1.
Figure 3B:
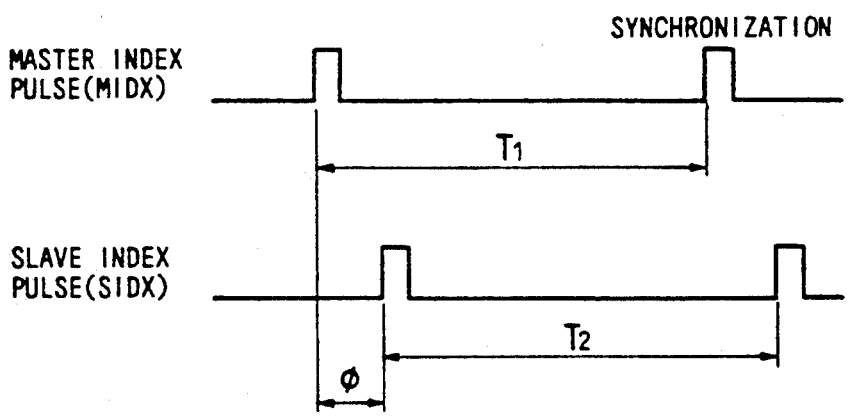
Figure 3C:
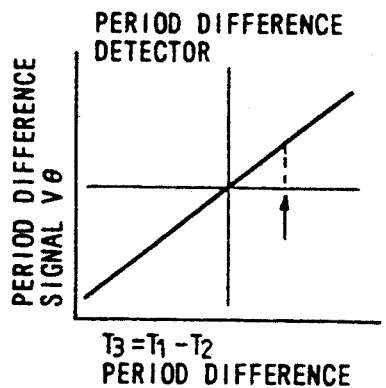
FIGS. 3c and 3d are diagrams showing output signals of a period difference detector and of a phase comparator of FIG. 1.
Figure 3D:
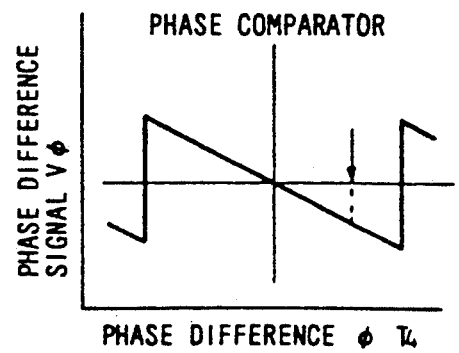

The slave storage unit 200 has a phase comparator 8a that detects the difference of rotational phase between the spindle motors 5 and 5a of the master and slave storage units 100 and 200. As shown in FIGS. 3b, and 3d the phase comparator 8a in the slave storage unit 200 receives the master index pulse (MIDX) and the slave index pulse (SIDX), and produces a phase difference signal $V_\phi$ that corresponds to the phase difference $\phi$ generated by these signals. The phase difference signal $V_\phi$ is given, via a switch 12a, to an adder 3a that is inserted between velocity error detector 2a and motor driver 4a. Through adder 3a, the phase difference signal $V_\phi$ is fed back to the control system, and spindle motor 5a is controlled so as to reduce the difference of rotational phase between the master index pulse (MIDX) and the slave index pulse (SIDX). At this moment, the switch 12a is instructed to be opened or closed by a SYNC-ON signal 600 given from a higher-rank unit, and is closed during the synchronous operation.

The slave storage unit 200 is further provided with a period difference detector 9a that produces a period difference signal $V_\theta$ which corresponds to a period difference $T_3$ between the master index pulse (MIDX) and the slave index pulse (SIDX), a buffer 10a which stores and holds the period difference signal $V_\theta$, switches 11a and 14a, and an inverter 13a. As shown in FIG. 3c, the period difference signal $V_\theta$ corresponds to the difference of number of revolutions between the spindle motors 5 and 5a. The period difference signal $V_\theta$, stored by the buffer 10a, transmitted, via switch 11a, to the adder 3a inserted between the velocity error detector 2a and the motor driver 4a. The switch 11a is closed when a SYNC-ON signal 600 assumes the high level, and the period difference signal $V_\theta$, stored by the buffer 10a, is transmitted to the feedback loop control system as a compensation value during the synchronous operation. Buffer 10a includes a switch 14a and the stored value is updated every time the period difference signal $V_\theta$ is input when the SYNC-ON signal 600 assumes a low level that closes the switch 14a. However, when the SYNC-ON signal 600 assumes a high level that opens the switch 14a and closes the switch 11a the buffer 10a is not updated upon receiving the newly input period difference signal $V_\theta$, but produces the period difference signal $V_\theta$ that has been held as a compensation value.

The operation of an embodiment of the invention will now be described.

The reference frequency generators 1 and 1a in the storage units 100 and 200 have an equal reference frequency to rotate the spindle motors 5 and 5a in synchronism with each other.

To obtain a synchronous rotation, first, the spindle motors 5 and 5a in the storage units 100 and 200 are independently rotated until they reach steady speed. During this time, the SYNC-ON signal 600 is assuming a low level (asynchronous state), switches 11a and 12a are opened, and switch 14a is closed. The frequencies of the reference frequency generators 1 and 1a in the storage units 100 and 200 are set equaly to rotate the spindle motors 5 and 5a in synchronism. However, the numbers of revolutions of the two spindle motors 5 and 5a are not in perfect agreement with each other, even during the steady-speed operation, and there is a difference in the number of revolutions, as illustrated in FIG. 3a. This is attributed, for example, to a slight difference in the oscillation frequencies of quartz oscillators included in the reference frequency generators 1 and 1a, and variations of characteristics of circuit components in the reference frequency generators 1 and 1a.

When the spindle motor 5 of the master storage unit 100 is started under this condition, the frequency generator 7 generates signals of a frequency proportional to the number of revolutions of the spindle motor 5. These signals are input to the velocity error detector 2 where they are compared with the outputs of the reference frequency generator 1, and a control signal Vv which is proportional to the difference of these signals is transmitted to the motor driver 4 which supplies a drive current proportional to the control signal Vv to the spindle motor 5. Owing to the feedback control of speed as described above, the spindle motor 5 in the storage unit 100 revolves at a number of revolutions substantially equal to the number of revolutions set by the reference frequency generator 1. The index pulse generator 6 generates master index pulses (MIDX) of a period $T_1$ at a rate of one pulse per revolution of the spindle motor 5, and the pulses are received by period difference detector 9a and the phase comparator 8a.

The slave storage unit 200 operates in the same manner as that of the master unit because the switches 11a and 12a are open when the SYNC-ON signal 600 assumes 1a low level (asynchronous state), and the spindle motor 5a rotates at a frequency substantially equal to the frequency set by the reference frequency generator 1a. The index pulse generator 6a generates slave index pulses (SIDX) of a period $T_2$, at a rate of one pulse per revolution of spindle motor 5a, and the slave index pulses are input by period difference detector 9a and phase comparator 8a. The period difference detector 9a produces a period difference signal $V_\theta$ that corresponds to the period difference $T_3$ $(=T_1-T_2)$ between the master index pulse (MIDX) and the slave index pulse (SIDX) as illustrated in FIG. 3c. When the SYNC-ON signal 600 has a low level (asynchronous state), switch 11a remains open and the period difference signal $V_\theta$ is sent to the buffer 10a where it is stored. The buffer 10a stores a value of the period difference signal $V_\theta$ that is successively sent thereto while updated by a newly sent signal. The phase comparator 8a receives the master index pulse (MIDX) and the slave index pulse (SIDX), and produces a phase difference signal $V_\phi$ that corresponds to the difference of phases of these signals. However, signal $V_{100}$ is not sent to adder 3a when the SYNC-ON signal 600 has the low level (asynchronous state) because switch 12a remains open.

After the frequency of the spindle motors 5 and 5a of the master and slave sides are stabilized, the synchronous operation is started with the SYNC-ON signal 600 going to a high level. When the SYNC-ON signal 600 assumes a high level (synchronous state), switches 11a and 12a are closed, and switch 14a is opened. The buffer 10a is no longer updated to store the newly input period difference signal $V_\theta$ and sends the old period difference signal $V_\theta$ that has been held previously stored at that moment as a compensation value to the adder 3a. Further, since switch 12a is closed, the phase difference signal $V_\phi$ is sent to adder 3a. Then, the period difference signal $V_\theta$ and the phase difference signal $V_\phi$ are applied to the speed control feedback system of the slave side. The spindle motor 5a is controlled by the period difference signal $V_\theta$ so that the difference in the frequency of the spindle motors 5 and 5a during the steady operation is reduced. Motor 5a is further controlled by the phase difference signal $V_\phi$ so as to have the same phase as that of the spindle motor 5.

The principle of controlling the speed of the spindle motor 5a of the slave side using the period difference signal $V_\theta$ and the phase difference signal $V_\phi$ will now be described in conjunction with FIGS. 4a to 4d which illustrate examples of controlling when the steady revolution speeds of the spindle motors 5 and 5a of the master side and the slave side are slightly different.

FIG. 4a shows a switching timing of the SYNC-ON signal 600. When the revolutions of the spindle motors 5 and 5a are stabilized, the SYNC-ON signal 600 changes from a low level to a high level, and the synchronous operation is started. Then, the control signal Vva produced from the velocity error detector 2a, changes as shown in FIG. 4b wherein the ordinate represents a voltage of control signal Vva. After the synchronous operation is started, the period difference signal $V_\theta$ and the phase difference signal $V_\phi$ are added to the adder 3a, and the velocity error detector 2a produces an error signal having a magnitude that corresponds to the difference between the frequency of reference frequency generator 1a and the frequency of the spindle motor generated by 7a.

In FIG. 4c, the output of phase difference signal $V_\phi$ is illustrated. When the synchronous operation is started, switch 12a is closed and the phase difference signal $V_\phi$ is applied to adder 3a. If it is now assumed that the period difference signal $V_\theta$ is not given to the adder 3a, there exists a difference in the number of steady revolutions between the two spindle motors 5 and 5a. Therefore, even if it is attempted to maintain synchronism of revolutions using index pulses (MIDX, SIDX) that are generated at a rate of one pulse per revolution of the spindle motors 5 and 5a, the difference readily develops in the revolutions immediately after the accomplishment of synchronism since the spindle motors 5 and 5a have different numbers of steady revolutions. That is, since the feedback control is carried out with repetition of the accomplishment of synchronism and out-of-phase, a steady phase difference exists that corresponds to a steady period difference $T_3$ as indicated by a dotted line in FIG. 4c.

In this embodiment, as shown in FIG. 4d, the period difference signal $V_\theta$ is added to the adder 3a, to compensate for the difference in the number of steady revolutions between the two spindle motors 5 and 5a. The period difference signal $V_\theta$ is a compensation value which usually has a constant value proportional to the number of steady revolutions of the spindle motors 5, 5a measured when the SYNC-ON signal 600 is low (asynchronous state). With the period difference signal $V_\theta$ being applied in advance to the adder 3a as a compensation value for compensating the difference in the numbers of steady revolutions of the spindle motors 5 and 5a, as described above, it is allowed to compensate the phase using the phase difference signal $V_\phi$, preventing the generation of a steady state phase difference.

Figure 5:
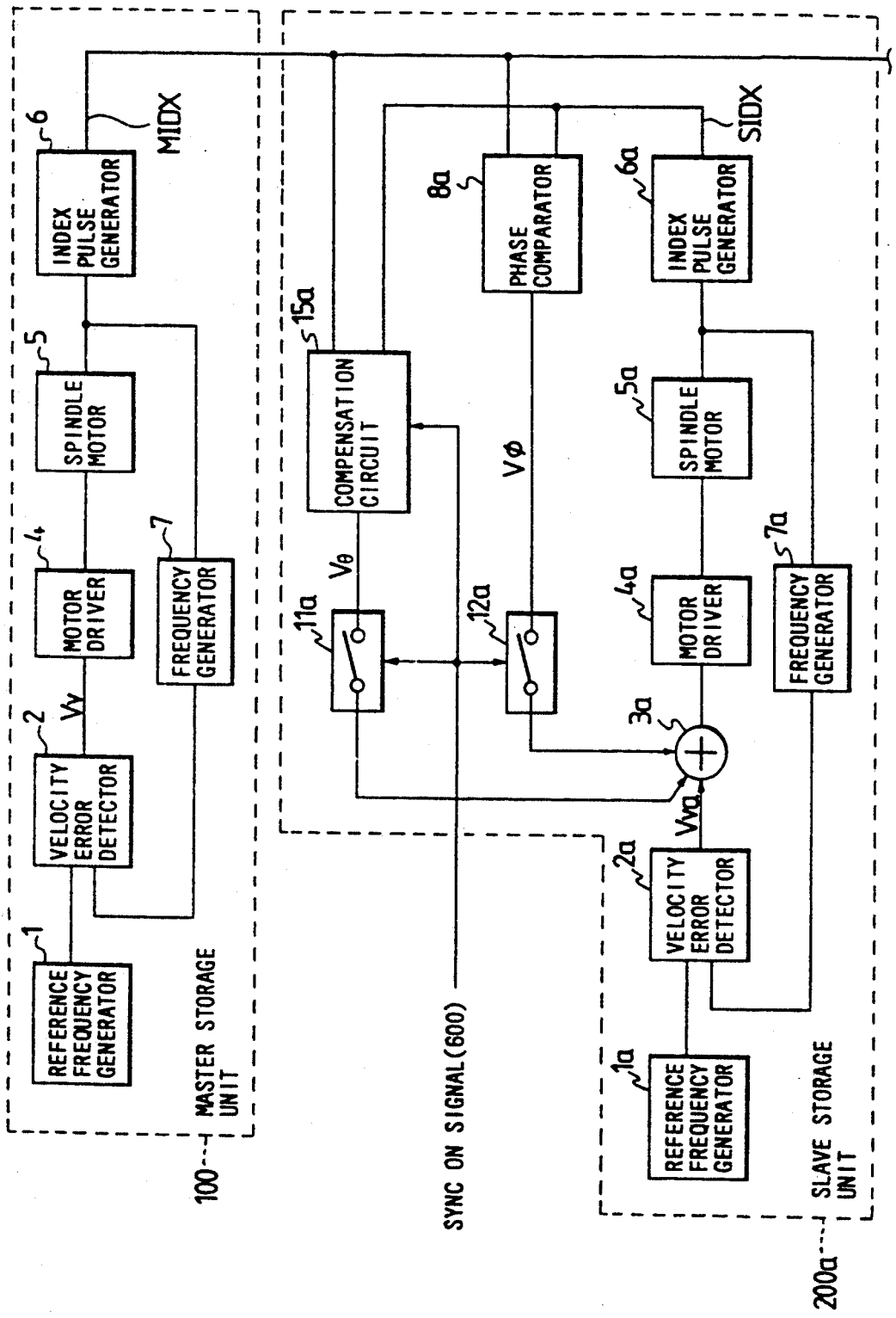
FIG. 5 is a block diagram showing a synchronized motor control system for disk drives, according to another embodiment of the present invention.

FIG. 5 is a block diagram of a synchronized motor control system for disk drives of an alternative embodiment of the present invention. According to this embodiment, the slave storage unit 200a is provided with a compensation circuit 15a which produces a compensation value corresponding to the period difference $T_3$ instead of the provision of the period difference detector, switch 14a and buffer 10a. The period difference signal $V_\theta$ corresponding to the period difference $T_3$ is produced when the SYNC-ON signal 600 assumes the high level. The operation will now be described in detail with reference to FIG. 6.

Figure 6:
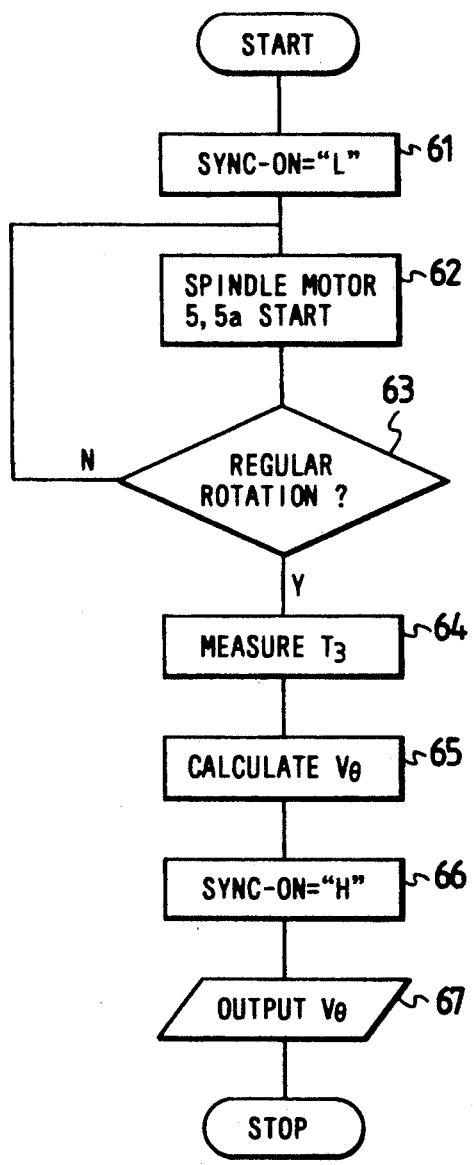
FIG. 6 is a flow chart illustrating the operation of the synchronized motor control system for the disk drives of FIG. 5.

FIG. 6 is a flow chart which illustrates the operation of the synchronized motor control system for disk drives of FIG. 5. First, the SYNC-ON signal is set at the low level (step 61), and the spindle motors 5 and 5a are driven asynchronously (step 62). Then, it is detected whether the frequency of revolutions of the spindle motors 5 and 5a is stable at a steady value, for example, 3600 rpm (step 63). When a steady revolution is obtained, the compensation circuit 15a measures the rotational period difference $T_3$ of the spindle motors 5 and 5a (step 64). Then, the compensation circuit 15a calculates a period difference signal $V_\theta$ based on the rotational period difference $T_3$ (step 65). Instead of the method of the above calculation, the measurement may be carried out with a timer that is not shown to affect the calculation by a microprocessor. It is further allowable to store the compensation values corresponding to the rotational period difference $T_3$ as a table in the ROM or the like in advance to find a value with reference to this table. Next, the SYNC-ON signal is set at the high level (step 66), and the period difference signal $V_\theta$ that is found is applied to the feedback system via the adder 3a (step 67). The operation is the same as that of FIG. 1 and will not be explained.

In the foregoing was described the invention accomplished by the present inventors by way of embodiments. It should, however, be noted that the present invention is in no way limited to the above-mentioned embodiments only but can be modified in a variety of other ways without departing from the gist and scope of the invention.

For instance, it is also allowable to arbitrarily set the value of period difference signal $V_\theta$ and to arbitrarily set the period difference between the slave storage unit and the master storage unit. This makes it possible to shift the phase by a time necessary for switching the operation for sending/ receiving the data to/from a plurality of storage units, in order to reduce the revolution wait time for the switching operation.

We claim:

1. A synchronized motor control system for storage units each having a recording medium on which a servo signal is recorded, comprising:

a master storage unit having a first spindle motor for rotating its recording medium, a first speed control circuit for controlling the rotational speed of said first spindle motor, and a first reference signal generator for generating a first reference signal; and a slave storage unit having a second spindle motor for rotating its recording medium, a second speed control circuit for controlling the rotational speed of said second spindle motor, a second reference signal generator for generating a second reference signal derived from the rotation of at least one of the second spindle motor and its recording medium, a period difference detector for generating a period difference signal between said first and second reference signals, a phase difference detector for generating a phase difference signal between said first and second reference signals with the phase difference signal and the period difference signal being separate signals, and an adder for adding each of said separate period difference signal and said phase difference signal to said second speed control circuit.

2. A synchronized motor control system according to claim 1, wherein said servo signal comprises an index pulse which is recorded for each rotation of each of said recording mediums.

3. A synchronized motor control system according to claim 1, wherein said first and second control circuits comprise a reference frequency generator for generating a clock signal, a motor driver for suppling a power source to said spindle motor, a frequency generator for generating a feedback signal in accordance with rotation of said spindle motor, and a velocity error detector for generating a drive control signal of said motor driver from said clock signal and said feedback signal.

4. A synchronized motor control system according to claim 3, wherein said slave storage unit further comprises a first switch for switching said period difference signal, a buffer memory for storing said period difference signal transmitted through said first switch, and a second switch for switching said phase difference signal.

5. A synchronized motor control system according to claim 4, wherein said phase difference signal is received by said adder only when said second switch is in a closed position.

6. A synchronized motor control system according to claim 4, wherein said slave storage unit further comprises a third switch for switching said phase difference signal in said buffer memory to said adder; and wherein said first switch, second switch and third switch are connected together so that said second and third switches are closed and opened simultaneously with opening and closing of said first switch, respectively; and further said switches are connected so that when closed said third and second switches transmit said period difference signal and said phase difference signal respectively to said adder, and said first switch updates said buffer memory with said period difference signal when said second and third switches are open preventing transmission of their respective signals to said adder.

7. A synchronized motor control system according to claim 6, wherein said servo signal comprises an index pulse recorded for each rotation of said recording medium.

8. A synchronized motor control system according to claim 7, wherein each of said master storage unit and said slave storage unit include a reference frequency generator providing a reference frequency signal, a frequency generator for generating a motor frequency correlated to the speed of rotation of the respective spindle motor, and a velocity error detector for producing a velocity error by comparing the reference frequency signal and the motor frequency signal and outputting a velocity error to said adder;

said adder simultaneously adding said velocity error signal, said phase difference signal and said period difference signal to produce an adder output for said slave storage unit; and said master storage unit having a motor driver circuit directly connected between it's velocity error detector and its spindle motor, said slave storage unit having a motor driver directly connected between its adder and its spindle motor; said master storage unit and slave storage unit each independently controlling the speed of their spindle motors in an asynchronous mode when said second and third switches are open; said master storage unit controlling its spindle motor in an asynchronous mode when said second and third switches are closed; and said slave storage unit controlling its spindle motor in a synchronous mode when said second and third switches are closed.

9. A storage unit having a rotational recording medium on which a servo signal is recorded, comprising:

motor means for rotating said recording medium;

means for generating an index signal from said servo signal during the rotating of the recording medium;

means for generating a period difference signal between said index signal and a reference signal generated by another device;

means for generating a phase difference signal between said index signal and said reference signal with the phase difference signal and the period difference signal being separate signals; and speed control means for controlling rotational speed of said motor means in accordance with each of said period difference signal and said separate phase difference signal.

10. A storage unit according to claim 9, wherein said means for generating an index signal generates a pulse signal for every rotation of said rotational recording medium.

11. A storage unit according to claim 9, wherein said speed control circuit comprises:

means for generating a clock signal;

means for supplying a power source to said motor means;

means for generating a feedback signal in accordance with rotation of said motor means; and means for generating a drive control signal to said supplying means from said clock signal and said feedback signal.

12. A method of synchronizing rotation of a first spindle motor of a first storage unit with that of a second spindle motor of a second storage unit, comprising the steps of:

rotating said first and second spindle motor;

detecting the rotational speed of said first spindle motor;

generating a first reference signal of the rotation of said first spindle motor, said first reference signal being relative to said rotational speed of said first spindle motor;

detecting the rotational speed of said second spindle motor;

generating a second reference signal of the rotation of said second spindle motor, said second reference signal being relative to said rotational speed of said second spindle motor;

comparing said first reference signal with said second reference signal, and generating a phase difference signal;

comparing said first reference signal with said second reference signal, and generating a period difference signal with the phase difference signal and the period difference signal being separate signals; and controlling the rotation of said second spindle motor in accordance with said period difference signal and said separate phase difference signal simultaneously so that both the rotational speed and phase of said second spindle motor is in synchronism with the rotation of said first spindle motor.

13. A method of synchronizing according to claim 12, wherein said period difference signal is calculated using the difference in period between the rotation of the first and second spindle motors.

14. A method of synchronizing according to claim 12, wherein said period difference signal is calculated by a microprocessor using a timer.

15. A method of synchronizing according to claim 12, wherein said phase difference signal is used to look up a compensation value in a table, said compensation value being used to control the phase of the second spindle motor.

16. A method of synchronizing rotation of a first recording medium of a first storage unit with that of a second recording medium of a second storage unit, comprising the steps of:

rotating said first and second recording mediums in an asynchronous mode until they each reach a steady state speed according to respective first and second references;

thereafter detecting the rotational characteristics of said rotating first and second recording mediums;

generating a first reference signal which contains the rotational characteristics of said first recording medium;

generating a second reference signal which contains the rotation characteristics of said second recording medium;

comparing said first reference signal with said second reference signal and separately generating a phase difference signal and a period difference signal in a synchronous mode after steady state speeds have been reached;

controlling the rotational speed of said second recording medium in accordance with a combination of each of said phase difference signal, said period difference signal and said second reference in the synchronous mode until the first and second recording mediums have the same phase and same steady state period of rotation.

* * * * *